US00RE36905E

United States Patent [19]

Noble et al.

[11] E Patent Number: Re. 36,905

[45] Reissued Date of Patent: Oct. 10, 2000

[54] FIGURE ENHANCING GARMENT

[75] Inventors: Rhonda W. Noble; Edward J. Noble, Jr., both of Corona Del Mar, Calif.

[73] Assignee: Noble Ideas, Inc., Corona Del Mar, Calif.

[21] Appl. No.: 09/169,544

[22] Filed: Oct. 9, 1998

Related U.S. Patent Documents

Reissue of:

[64] Patent No.: 5,784,723
Issued: Jul. 28, 1998
Appl. No.: 08/692,845
Filed: Aug. 2, 1996

U.S. Applications:

[63] Continuation-in-part of application No. 08/670,607, Jun. 26, 1996, abandoned.

[51] Int. Cl.[7] ..... A41B 9/00; A41B 9/02

[52] U.S. Cl. ..... 2/400; 2/338; 2/228; 2/238; 450/95; 450/100

[58] Field of Search ..... 2/400, 401, 403, 2/406, 237, 337, 338, 339, 341, 84, 78.1; 450/95, 99, 100, 107, 119, 121

[56] References Cited

U.S. PATENT DOCUMENTS

| | | | |
|---|---|---|---|
| 722,121 | 3/1903 | Lupfer . | |
| 751,641 | 2/1904 | Hazelbaker | 450/107 |
| 1,254,463 | 1/1918 | Arrington | 2/400 X |
| 1,339,070 | 5/1920 | Sanders | 2/403 X |
| 1,711,172 | 4/1929 | Longfellow | 2/78.1 |
| 2,027,622 | 1/1936 | Stam | 2/403 X |
| 2,091,018 | 8/1937 | Sivyer | 2/406 |
| 2,622,600 | 12/1952 | DeGuyot et al. | 2/406 X |
| 3,037,503 | 6/1962 | Ravaschieri | 2/403 X |
| 3,116,736 | 1/1964 | Alberts | 450/100 |
| 4,121,305 | 10/1978 | Kolker | 2/406 |
| 4,176,408 | 12/1979 | de Polo | 2/67 |
| 4,731,882 | 3/1988 | Ekman | 2/69 |
| 5,299,323 | 4/1994 | Schaefer et al. | 2/237 X |
| 5,367,709 | 11/1994 | Teasley | 2/69 |

*Primary Examiner*—John J. Calvert
*Assistant Examiner*—Shirra L. Jenkins
*Attorney, Agent, or Firm*—Lyon & Lyon LLP

[57] ABSTRACT

A figure-enhancing garment, which outlines and defines a wearer's body contours in a comfortable manner, includes a pair of pants having first and second pant leg portions, a front panel portion, and a waistband with a tunnel formed therein. The first and second pant leg portions are attached to the front panel portion via first and second interconnected tunnel seams that extend divergently from the crotch area and interconnect with the waistband tunnel. A third tunnel steam interconnects with the first and second tunnel seams and the waistband tunnel while extending upwardly from the crotch portion to the waistband. An adjustable pulley system extends through the waistband tunnel and the first, second and third tunnel seams to adjust the fit of the figure enhancing garment. Alternatively, the first and second seams are simple seams without tunnels. A pair of drawstrings anchored in the crotch portion of the pants, extend upwardly through the tunnel of the third seam and divergently through the tunnel in the waistband to adjust the fit of the figure enhancing garment.

28 Claims, 5 Drawing Sheets

FIGURE ENHANCING GARMENT

Matter enclosed in heavy brackets [ ] appears in the original patent but forms no part of this reissue specification; matter printed in italics indicates the additions made by reissue.

This is a continuation-in-part of application Ser. No. 08/670,607, filed on Jun. 26, 1996 and which designated the U.S. and is now abandoned.

FIELD OF THE INVENTION

This invention relates to clothing, and more particularly to an adjustable garment that enhances the wearer's figure.

BACKGROUND OF THE INVENTION

Millions of men and [woman] *women* seek to improve their appearance on a daily basis. They try dieting or exercising, and some even try surgery in an attempt to improve the way they look. As an alternative or a supplement to dieting, exercising and surgery, many individuals have chosen to utilize a variety of garments that are marketed as figure enhancing tools.

Active wear clothing has emerged in an area of popularity for such garments. For example, certain shorts made from a stretch polyester or nylon knit-type fabric such as Lycra™ or Supplex™ are often marketed with the claim that the shorts will enhance a wearer's figure by improving the shape of the wearer's buttocks. However, contrary to these claims, many of these garments are so tight that they flatten the wearer's buttocks instead of improving its shape. Because the shorts are so tight they are in essence a girdle and are uncomfortable to wear. For those shorts that fit comfortably, they do not enhance or outline the wearer's buttocks as claimed.

These active wear shorts also typically have a seam that the runs downs the front of the shorts through the groin area and up the back of the shorts. The seam is directly in the middle of the front of the shorts which proves to be a troublesome location for a female wearer of the shorts. Because of the seams location a condition develops that tends to reveal the contours of a female wearer's external genitalia. The seam tends to cause the garment to ride up or bind in the area between and around the female wearer's labia resulting in not only an appearance that is undesirable, but also in a condition that is both irritating and/or uncomfortable.

Therefore, it would be desirable to have a garment that provides the desired outlining enhancement to the wearer's buttocks, that is comfortable to wear and that does not undesirably ride up or bind on female wearers.

SUMMARY OF THE INVENTION

The figure enhancing garment of the present invention serves to enhance a wearer's figure by further outlining and defining the wearer's body contours in a comfortable manner and tends to reduce the undesirable effects of the garment riding or binding up on a female wearer. The figure enhancing garment of the present invention is preferably constructed of a stretch polyester or nylon knit type fabric such as Lycra™ or Supplex™. In a preferred embodiment, the garment includes a pair of pants having first and second pant leg portions, a front panel portion, and a waistband, formed in the top portion of the pair of pants. The first and second pant leg portions are attached to the front panel using first and second interconnected seams. The first and second seams extend divergently from a crotch portion of the pants to the waistband of the pants. A third seam is interconnected to the first and second seams and extends along the rear of the pants upwardly from the crotch portion to the waistband.

The first, second and third seams are preferably constructed to form first, second and third tunnels in the fabric of the pants. The first, second and third tunnels are interconnected adjacent the crotch portion of the pants and are interconnected to a waistband tunnel constructed in the waistband of the pants.

An adjustable pulley system extends throughout the first, second, third and waistband tunnels. The pulley systems includes a belt portion extending through the waistband tunnel around a backside portion of the waistband, a first elastic member extending through and between the first and second tunnels along the first and second seams, and a second elastic member extending through the third tunnel along the third seam. The first elastic member is adjustably interconnected to the belt portion in the waistband tunnel adjacent the intersections between the waistband tunnel and the first and second tunnel seams, while the second elastic member is slidably connected to the belt portion in the waistband tunnel and the first elastic member adjacent the crotch portion of the pants.

The belt portion also includes a pair of rings attached to its opposing ends. The opposing ends of the first elastic member extend through the rings into the waistband tunnel. Attached to the opposing ends of the first elastic member are a pair of tie cords that extend through the waistband tunnel and exit through a pair of holes cut into the waistband tunnel.

In operation, the wearer puts on the figure enhancing garment, and then utilizes the pulley system to lift and shape the wearer's buttocks and further enhance the wearer's figure by outlining the wearer's body contours. This is accomplished by pulling on the tie cords which in turn draws the first elastic member through the rings, and further draws the second elastic member upwardly and inwardly along the backside of the garment. The drawing of the second elastic member upwardly and inwardly tends to lift and separate the wearer's buttocks, and thus, further define or outline the contours of the wearer's body.

Alternatively, the first and second seams of the figure enhancing garment are simple seams without tunnels formed therein. A pair of drawstrings are anchored in the crotch area and extend up through the tunnel of the third seam to the tunnel in the waistband. At the intersection of the two tunnels the drawstrings diverge and are directed in opposite directions through the tunnel in the waist band by a ring or button hole sewn therein. In operation, the wearer utilizes the drawstrings to lift and shape the wearer's buttocks and further enhance the wearer's figure by outlining the wearer's body contours. This is accomplished by pulling on the drawstrings which draws the third seam inwardly and upwardly along the backside of the garment. As with the pulley system above, the drawing of the third seam upwardly and inwardly tends to lift and separate the wearer's buttocks, and thus, further define or outline the contours of the wearer's body.

An object of this invention is to provide an improved figure enhancing garment.

Further objects and advantages of the present invention will become apparent from a consideration of the drawings and ensuing description.

DESCRIPTION OF THE PREFERRED EMBODIMENT

Figure 2:
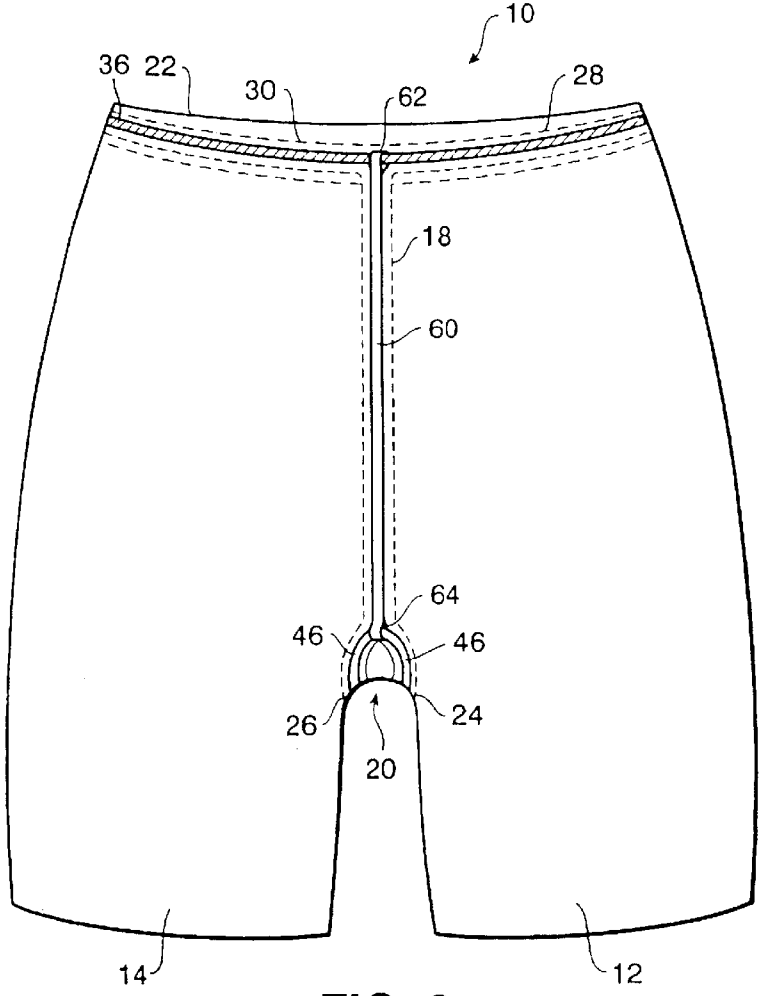
FIG. 2 is a rear view of the embodiment of the figure enhancing garment shown in FIG. 1.
Figure 1:
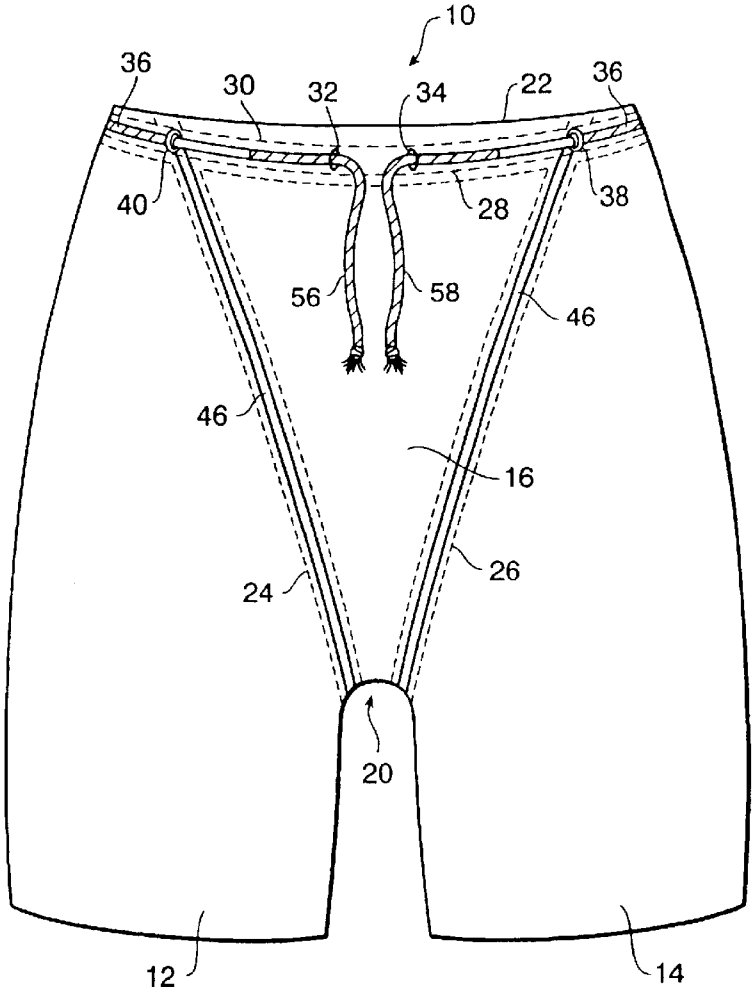
FIG. 1 is a front view of an embodiment of a figure enhancing garment of the present invention.

Referring now in detail to the drawings, therein illustrated is a preferred embodiment of a novel figure enhancing garment of the present invention. Turning to FIGS 1 and 2, the figure enhancing garment is shown as a pair of short pants 10 for exemplary purposes only. Persons skilled in the art will understand that the figure enhancing garment could be embodied as shorts, long pants, briefs or swim wear. Preferably, the garment is constructed from a stretch polyester or nylon knit type fabric such as Lycra™ or Supplex™.

The shorts 10 include a right leg portion 12, a left leg portion 14 and a "V" shaped front panel 16. The right and left leg portions 12 and 14 are sewn together in the rear of the shorts 10 forming a rear seam 18 that rises vertically from the crotch area 20 to the top 22 of the shorts 10. The front panel 16 is sewn to the right and left leg portions 12 and 14 forming a pair of seams, the front right seam 24 and the front left seam 26, that rise vertically in a divergent manner from the crotch area 20 to the top 22 of the shorts 10 adjacent to the location of a wearer's hips. The right and left front seams 24 and 26 interconnect with each other and with the rear seam 18 in the crotch area 20. The seams 18, 24 and 26 are constructed in a manner known in the art to form a tunnel in the fabric. Thus, the interconnected seams 18, 24 and 26 form interconnected tunnels through which cotton cording or elastic strips pass.

A waist band 28 is sewn around the top 22 of the shorts. The waist band 28 includes a tunnel 30 formed in the waist band 28 extending around the top 22 of the shorts 10. A pair of holes 32 and 34 are cut into the waist band tunnel 30 adjacent to its midpoint along the front panel 16. The tunnel seams 18, 24 and 26 interconnect with the waist band tunnel 30 adjacent the top 22 of the shorts 10.

Figure 3:
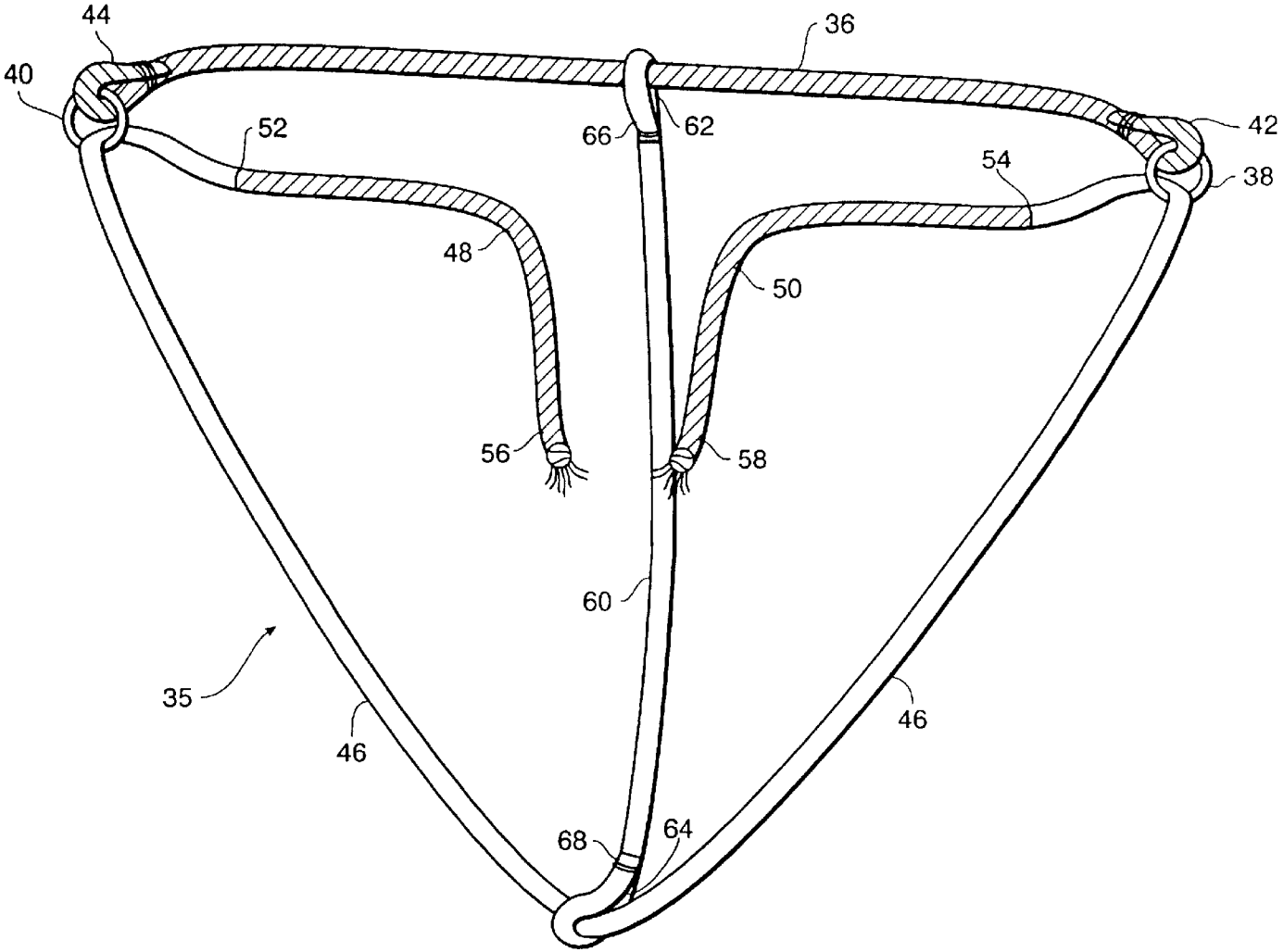
FIG. 3 is an isometric view of an embodiment of an adjustable pulley system utilized in the figure enhancing garment shown in FIGS. 1 and 2.

Turning to FIG. 3, an adjustable pulley system 35 is shown to include a belt portion 36 preferably formed from cotton cording. A pair of rings 38 and 40, preferably made from plastic or metal, are anchored to each of the opposing ends 42 and 44 of the belt portion 36. The belt portion 36 is inserted in the waist band tunnel 30 along the backside of the shorts 10 positioning the rings 38 and 40 adjacent to the intersections between the waist band tunnel 14 and the right and left front tunnel seams 24 and 26 adjacent the top of the front panel 16.

A front elastic member 46, having a pair of tie cords 48 and 50 extending from its opposing ends 52 and 54, extends through and between the right and left front tunnel seams 24 and 26. The opposing ends 52 and 54 of the front elastic member 46 and attached tie cores 48 and 50 extend through the rings 38 and 40 in the waist band tunnel 30 and pass inwardly through the waist band tunnel 30 along the top of the front panel 16. The ends 56 and 58 of the tie cords 48 and 50 are pulled through the pair of holes 32 and 34 to extend the tie cords 48 and 50 out of the waist band tunnel 30. Preferably, the tie cores 48 and 50 are made from cotton cording.

A rear elastic member 60, having a pair of loops 62 and 64 formed in its opposing ends 66 and 68, extends through the rear tunnel seam 18 from the intersection with the right and left front tunnel seams 24 and 26 in the crotch 20 of the shorts 10 to the waist band tunnel 30. The loops 62 and 64 slidably capture the front elastic member 46 in the crotch portion 20 of the shorts 10 and the belt portion 36 in the waistband tunnel 30.

In operation, the wearer puts on the shorts 10, in customary fashion, and then utilizes the pulley system 35 to lift and shape the wearer's buttocks and further enhance the wearer's figure by outlining the wearer's body contours. This is accomplished by pulling on the tie cords 48 and 50, which in turn draws the front elastic member 46 through the rings, 38 and 40, and further draws the rear elastic member 60 upwardly and inwardly along the backside of the shorts 10. The drawing of the rear elastic member 60 upwardly and inwardly tends to lift and separate the wearer's buttocks, and thus, further define or outline the contours of the wearer's body.

Some of the benefits of the figure enhancing garment include the adjustability of the built in pulley system 35 which allows a wearer to tighten the tie cords 48 and 50 to achieve a desired level of outlining or contour defining, or loosen the tie cords 48 and 50 to maintain a desired level of comfort. In addition, the location of the right and left front tunnel seams 24 and 26 tends to reduce the likelihood of the garment riding or binding up on a female wearer and resulting in the undesirable appearance and uncomfortable condition noted above.

Figure 4:
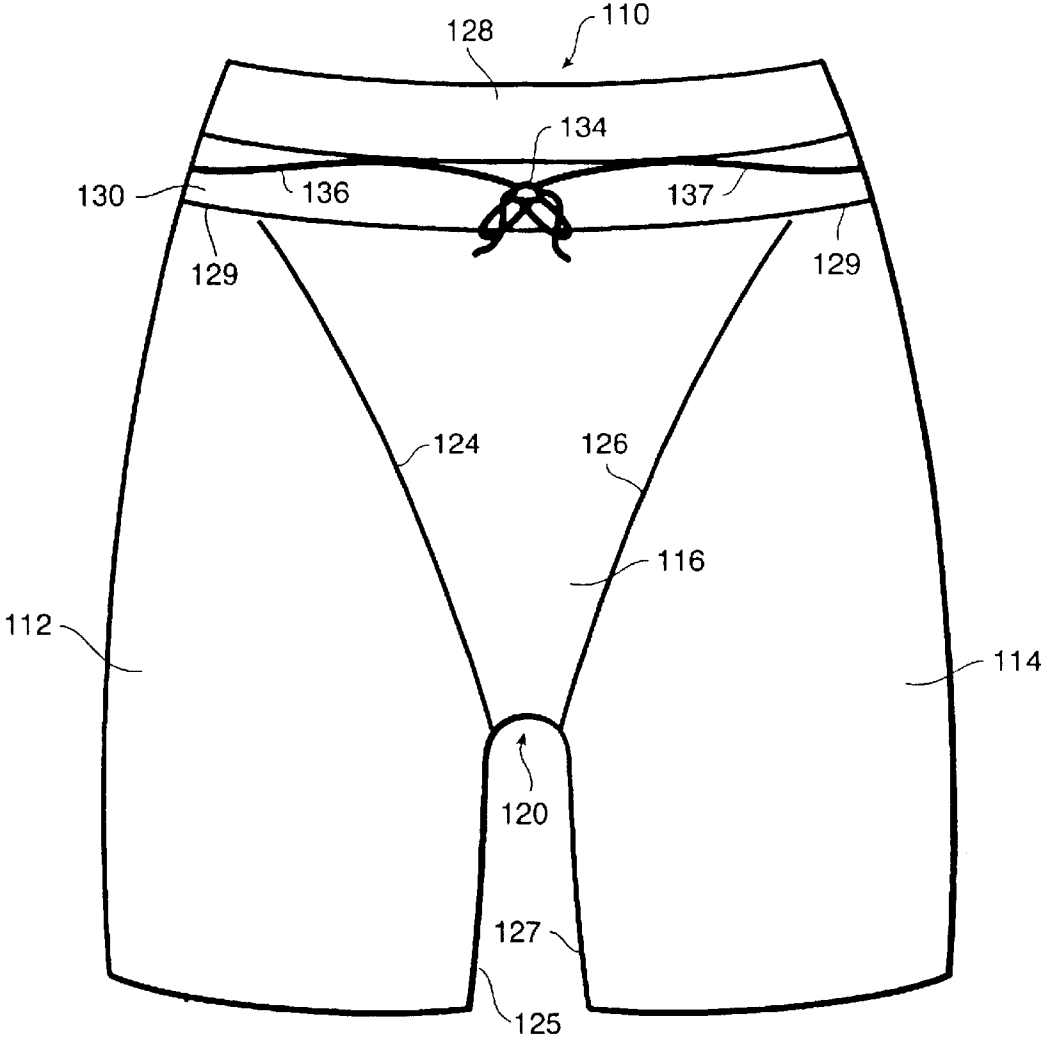
FIG. 4 is a front view of an alternate embodiment of the figure enhancing garment of the present invention.
Figure 5:
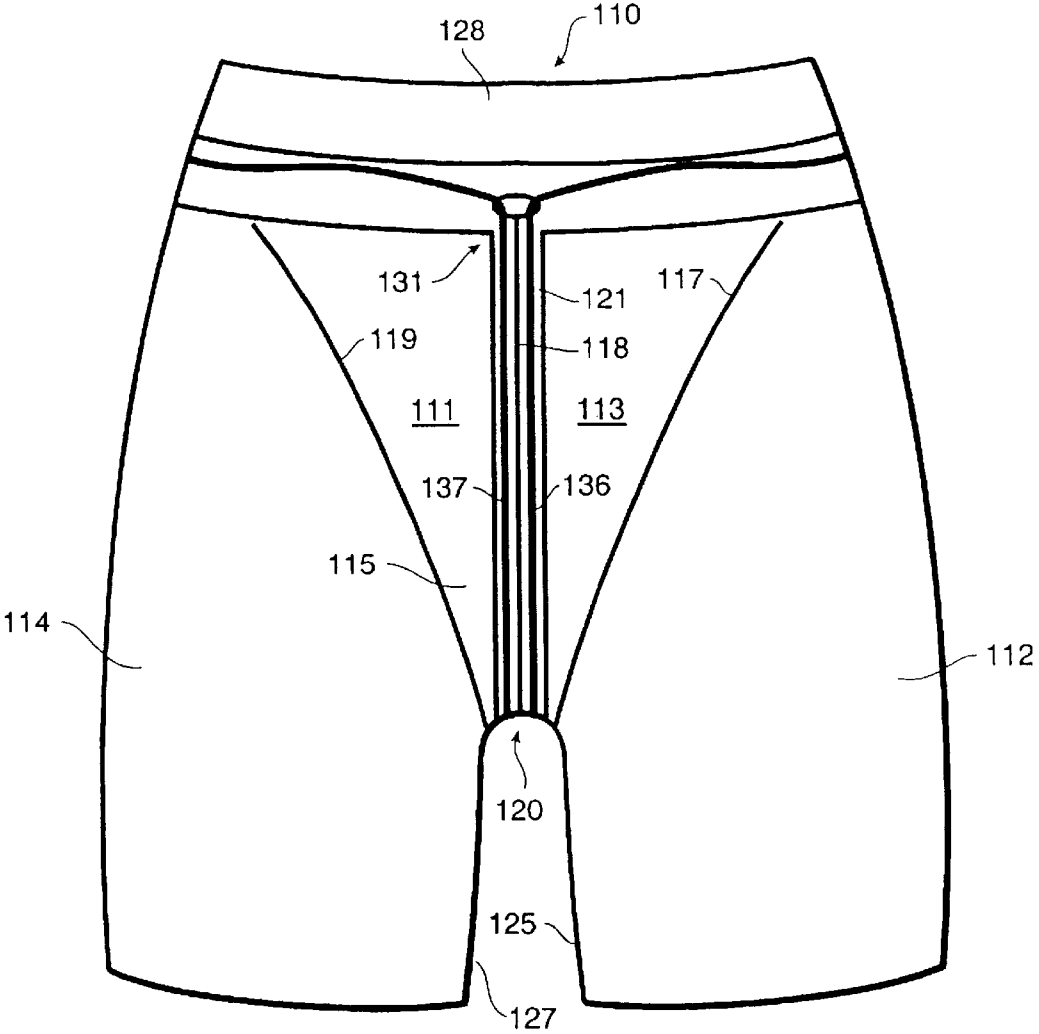
FIG. 5 is a rear view of the embodiment of the figure enhancing garment shown in FIG. 4.
Figure 6:
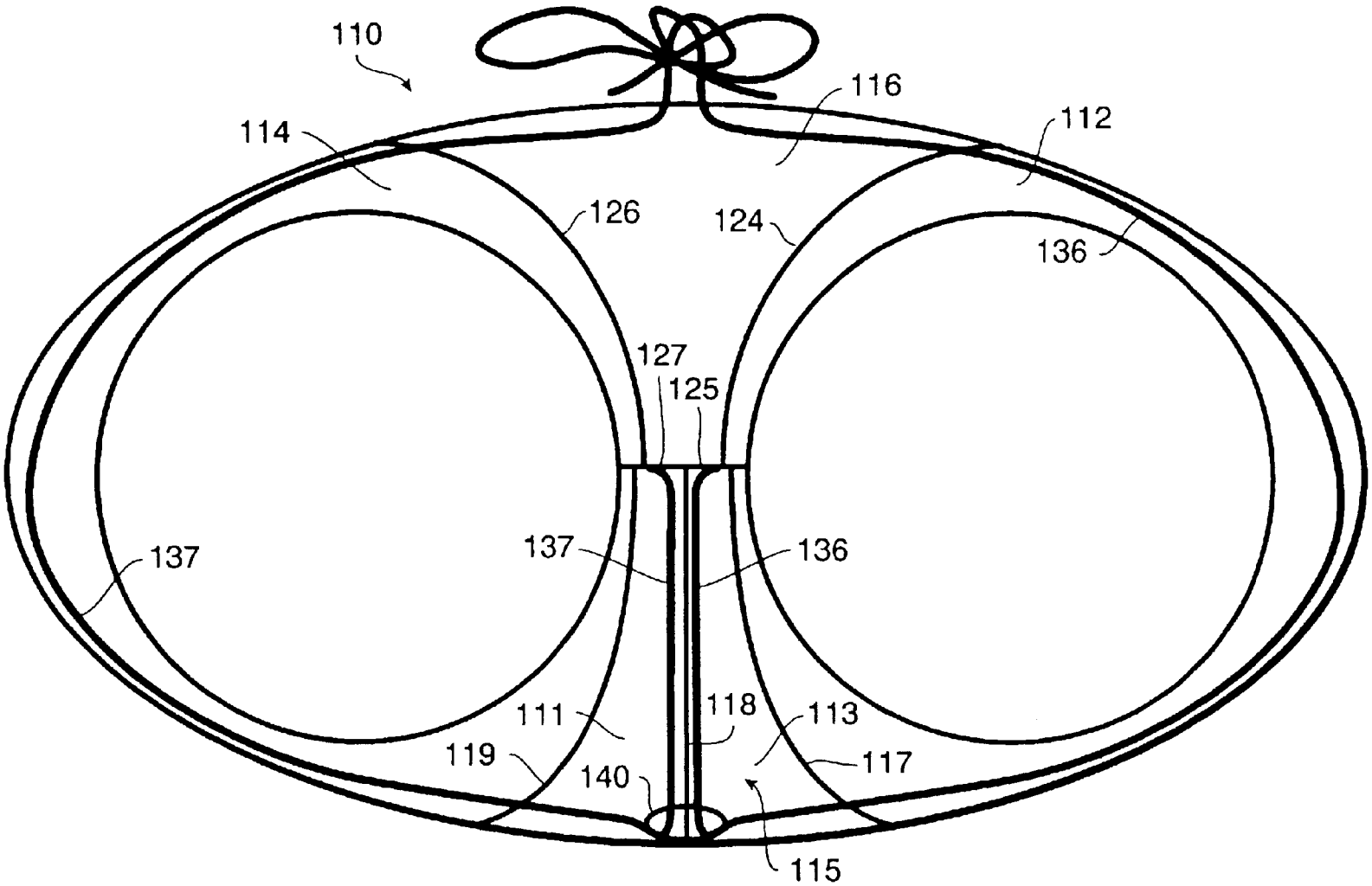
FIG. 6 is a rear view of the embodiment of the figure enhancing garment shown in FIGS. 4 and 5.

In an alternate embodiment of the figure enhancing garment, a pair of shorts 110 are shown in FIGS. 4–6 to be constructed similarly to the shorts 10 shown in FIGS. 1–2. The shorts 110 include a right left portion 112, a left leg portion 114, a "V" shaped front panel portion 116, a "V" shaped rear panel portion 115 and a waist band 128. The waistband 128 is sewn to the top of the right and left leg portions 112 and 114 and the top of the front and rear panel portions 116 and 115 forming a top seam 129 that extends around the perimeter of the shorts 110.

The right and left leg portions 112 and 114 are sewn to the front and rear panel portions 116 and 115 forming two pair of seams, the front right and left seams 124 and 126 and the rear right and left seams 117 and 119, that rise vertically in a divergent manner from the crotch area 120 along the front and rear panel portions 116 and 115, respectively, to the top seam 129. The right and left front seams 124 and 126 interconnect with the right and left rear seams 117 and 119 in the crotch area 120 at right and left interconnected inseams 125 and 127.

The rear panel portion 115 is formed from right and left panels 111 and 113. The right and left rear panels 111 and 113 are sewn together forming a central rear seam 118 along the center of the rear panel portion 115. The central rear seam, 118 rises vertically from the crotch area 120 extending from the inseams 125 and 127 to the top seam 129. The central rear seams 118 is constructed in a manner known in the art to form a tunnel 121 in the fabric. The rear seam tunnel 121 intersects with a tunnel 130 similarly formed in the waist band 128. The waistband tunnel 130 extends substantially all the way around the waist band 128. A hole 134 is cut into the waist band tunnel 130 adjacent to a midpoint of the waistband 128 along the front panel 116.

A pair of drawstrings 136 and 137 are anchored at first end in the crotch area 120 of the shorts 110 adjacent to the inseams 125 and 127. The drawstrings 136 and 137 extend from the crotch area 120 through the rear seam tunnel 121 up towards the intersection 131 between the rear seam tunnel 121 and the waist band tunnel 130. The drawstrings 136 and 137 diverge at the intersection 131 and are directed in opposite directions through the waist band tunnel 130 by a ring 140, or alternatively a button hole, sewn therein. The drawstrings 136 and 137 exit the tunnel 130 of the waistband 128 through the hole 134 cut in the tunnel 130 in the front of the waistband 128. The portion of the drawstrings 136 and 137 generally located between their anchors in the crotch area 120 and the intersection of the rear seam and waist band tunnels 121 and 130 is preferably made from a resilient material similar to nylon fishing line which enables the drawstrings 136 and 137 to easily slide or maneuver within the rear seam tunnel 121. The portion of the drawstrings 136 and 137 generally located in the waist band tunnel 130 is preferably made from cotton cording. It may be desirable to substitute an elastic material for all or part of the cotton cording or fishing line material.

In operation, the wearer puts on the shorts 110, in customary fashion, and then utilizes the drawstrings 136 and 137 to lift and shape the wearer's buttocks and further enhance the wearer's figure by outlining the wearer's body contours. This is accomplished by pulling on the drawstrings 136 and 137 and drawing the drawstrings 136 and 137 through the ring 140 at the intersection 131 between the tunnels 130 and 121. This action draws the rear central seam 118 upwardly and inwardly along the backside of the shorts 110. As with the pulley system noted above, the drawing of the central rear seam 118 upwardly and inwardly tends to lift and separate the wearer's buttocks, and thus, further define or outline the contours of the wearer's body.

The benefits of the alternate embodiment of the figure enhancing garment include the adjustability of the drawstrings 136 and 137 which allows a wearer to tighten the drawstrings 136 and 137 to achieve a desired level of outlining or contour defining, or loosen the drawstrings 136 and 137 to maintain a desired level of comfort. In addition, the location of the right and left front seams 124 and 126 tends to reduce the likelihood of the garment riding or binding up on a female wearer and resulting in the undesirable appearance and uncomfortable condition noted above.

Thus, the figure enhancing garment of the present invention provides many benefits over the prior art. While the above description contains many specificities, these should not be constructed as limitations on the scope of the invention, but rather as an exemplification of one preferred embodiment thereof. Many other variations are possible.

Accordingly, the scope of the present invention should be determined not by the embodiments illustrated above, but by the appended claims and their legal equivalents.

What is claimed is:

1. A figure enhancing garment comprising:

a pair of pants, and an adjustable pulley system built into the fabric of said pair of pants, said adjustable pulley system comprising a belt portion having opposing ends, a first elastic member adjustably coupled to said opposing ends of said belt portion, and a second elastic member slidably connected to said belt portion and said first elastic member and extending therebetween.

2. The figure enhancing garment of claim 1 wherein said pair of pants comprises first and second pant leg portions, a front panel portion, first and second interconnected seams extending divergently from a crotch portion towards a portion of said pair of pants and interconnecting said first and second pant leg portions to said front panel portion, and a third seam interconnected to said first and second seams and extending upwardly from the crotch portion towards the top portion of said pair of panels and interconnecting said first pant leg portion to said second pant leg portion.

3. The figure enhancing garment of claim 2 wherein said pair of pants further comprises a waistband formed in the top portion of said pair of pants.

4. The figure enhancing garment of claim 3 wherein said first, second and third seams are constructed to form first, second and third tunnels along said first, second and third seams, respectively, said first, second and third tunnels being interconnected adjacent the crotch portion of said pair of pants and being interconnected to a waistband tunnel constructed in said waistband of said pair of pants.

5. The figure enhancing garment of claim 3 wherein said first, second and third seams are constructed to form first, second and third tunnels in the fabric of said pair of pants, said first, second and third tunnels being interconnected adjacent the crotch portion of said pair of pants and being interconnected to a waistband tunnel constructed in said waistband of said pair of pants, wherein said belt portion extends through said waistband tunnel around a backside portion of said waistband, said first elastic member extends through and between said first and second tunnels along said first and second seams, said first elastic member being adjustably interconnected to said belt portion adjacent intersections between said waistband tunnel and said first and second tunnel, and said second elastic member extends through said third tunnel along said third seam, said second elastic member being slidably connected to said belt portion in said waistband tunnel and said first elastic member adjacent the crotch portion of said pair of pants.

6. An adjustable pulley system for a garment comprising a belt portion including first and second opposing ends, a first elastic member adjustably coupled to said first and second opposing ends of said belt portion, and a second elastic member slidably connected to said belt portion and said first elastic member and extending therebetween.

7. The adjustable pulley system of claim 6 wherein said belt portion comprises first and second rings attached to said first and second ends, said first elastic member extending therethrough.

8. A figure enhancing garment comprising first and second pant leg portions, a front panel portion, first and second interconnected seams extending divergently from a crotch portion towards a top portion of said pair of pants and interconnecting said first and second pant leg portions to said front panel portion, a third seam interconnected to said first and second seams and extending upwardly from the crotch portion towards the top portion of said pair of pants and interconnecting said first pant leg portion to said second pant leg portion, and an adjustable pulley system built into said first and second leg portions and said front panel portion along said first, second, and third seams.

9. The figure enhancing garment of claim 8 further comprising a waistband formed along the top portion of said first and second leg and front panel portions.

10. The figure enhancing garment of claim 9 wherein said first, second and third seams are constructed to form first, second and third tunnels along said first, second, and third seams, respectively, said first, second and third tunnel being interconnected adjacent a crotch portion of the figure enhancing garment and being interconnected to a waistband tunnel constructed in said waistband.

11. The figure enhancing garment of claim 10 wherein said adjustable pulley system comprises a belt portion extending through said waistband tunnel around a backside portion of said waistband, a first elastic member extending through and between said first and second tunnels along said first and second seams, said first elastic member being adjustably interconnected to said belt portion adjacent intersections between said waistband tunnel and said first and second tunnels, and a second elastic member extending through said third tunnel along said third seam, said second elastic member being slidably connected to said belt portion in said waistband tunnel and said first elastic member adjacent the crotch portion of the figure enhancing garment.

12. The figure enhancing garment of claim 11 wherein said belt portion comprises first and second opposing ends, and first and second rings attached to said first and second ends, said first elastic member extending therethrough.

13. A figure enhancing garment comprising first and second pant leg portions, a front panel portion, first and second [interconnect] *interconnected* seams extending divergently from a crotch portion towards a top portion of said first and second pant leg portions, and interconnecting said first and second pant leg portions to said front panel portion, a third seam interconnected to said first and second seams and extending upwardly from the crotch portion towards the top portion of said pair of pants and interconnecting said first pant leg portion to said second pant leg portion, said third seam being constructed to form a first tunnel along said third seam, a waistband attached to aid first and second pant leg portions and said [from] front panel portion, said waistband including a second tunnel formed therein, said second tunnel being interconnected with said first tunnel, and first and second drawstrings extending through said first and second tunnels.

14. The figure enhancing garment of claim 13, further comprising a ring positioned adjacent to an intersection between said first and second tunnels, said ring being operably coupled to said first and second drawstrings.

15. The figure enhancing garment of claim 13, further comprising a button-hole formed adjacent to an intersection between said first and second tunnels, said button-hole being operably coupled to said first and second drawstrings.

16. A figure enhancing garment comprising a pair of pants having first and second pant leg portions, a front panel portion, first and second interconnected seams extending divergently from a crotch portion towards a top portion of said pair of pants and attaching said first and second pant leg portions to said front panel portion, a third seam interconnected to said first and second seams and extending upwardly from the crotch portion towards the top portion of said pair of pants and attaching said first pant leg portion to said second pant leg portion, a waistband formed in the top portion of said pair of pants, a first tunnel formed in said waistband, and a second tunnel formed along said third seam and interconnected to said first tunnel, and an adjustable pulley system built into said pair of pants.

17. The figure enhancing garment of claim 16 wherein said adjustable pulley system comprises a pair of drawstrings anchored at one end adjacent to the crotch portion and extending through said first and second tunnels.

18. The figure enhancing garment of claim 17 wherein said adjustable pulley system further comprises a ring positioned adjacent an intersection between said first and second tunnels, said ring being operably connected to said pair of drawstrings.

*19. A figure enhancing system comprising*

*a garment having a waist portion, a crotch portion, a front portion extending between said crotch portion and said waist portion, and a rear portion extending between said crotch portion and said waist portion,*

*a first tunnel formed in said waist portion,*

*a second tunnel formed in said rear portion and extending from said crotch portion to said waist portion where said second tunnel is interconnected to said first tunnel, and*

*an adjustment system built into said garment.*

*20. The figure enhancing system of claim 19 wherein said adjustment system comprises a pair of drawstrings anchored at one end adjacent to sad crotch portion and extending through said first and second tunnels of said garment.*

*21. The figure enhancing system of claim 20 wherein said adjustment system further comprises a ring positioned adjacent an intersection between said first and second tunnels, said ring being operably connected to said pair of drawstrings.*

*22. A figure enhancing system comprising:*

*a garment having front, rear and waist portions, and*

*a drawstring extending upwardly and centrally along said rear portion and further extending substantially around said waist portion.*

*23. The figure enhancing system of claim 22 wherein said garment comprises first and second pant leg portions, said first and second pant leg portions being interconnected to one another and to said waist portion and a crotch portion.*

*24. The figure enhancing system of claim 22 wherein said drawstring is anchored to said garment adjacent a crotch portion of said garment.*

*25. A figure enhancing garment comprising*

*first and second pant leg portions,*

*a waist portion formed adjacent to a top of said first and said pant leg portions, and*

*a drawstring extending from a crotch portion centrally along a rear portion to and substantially around said waist portion.*

*26. The figure enhancing garment of claim 25 further comprising*

*a first tunnel formed in said waist portion and extending substantially therearound, and*

*a second tunnel extending from said crotch portion along the rear of the garment to said waist portion and interconnecting to said first tunnel, said drawstring extending through said first and second tunnels.*

*27. The figure enhancing garment of claim 26 further comprising a seam interconnecting said first and second pant leg portions in the rear of the figure enhancing garment and extending from said crotch portion to at least said waist portion wherein said second tunnel is formed along said seam.*

*28. The figure enhancing garment of claim 26 further comprising a ring positioned adjacent to an intersection between said first and second tunnels, said ring being operably coupled to said drawstring.*

* * * * *

UNITED STATES PATENT AND TRADEMARK OFFICE

CERTIFICATE OF CORRECTION

PATENT NO. : RE 36,905
DATED : October 10, 2000
INVENTOR(S) : Noble et al.

It is certified that error appears in the above-identified patent and that said Letters Patent is hereby corrected as shown below:

Column 3,
Line 18, please change “FIGS” to -- FIGS. --.
Line 63, please change “cores” to -- cords --.

Column 4,
Line 2, please change “cores” to -- cords --.
Line 37, please change “right left portion” to -- right leg portion --.
Line 59, please change “seam,” to -- seam --.
Line 61, please change “seams” to -- seam --.

Column 8,
Line 38, please change “sad” to -- said --.

Signed and Sealed this

Twelfth Day of November, 2002

*Attest:*

*Attesting Officer*

JAMES E. ROGAN
*Director of the United States Patent and Trademark Office*